US006999946B2

(12) United States Patent
Nuttall

(10) Patent No.: US 6,999,946 B2
(45) Date of Patent: Feb. 14, 2006

(54) METHOD FOR COMPUTER NETWORK OPERATION PROVIDING BASIS FOR USAGE FEES

(75) Inventor: François-Xavier Nuttall, Prevessin (FR)

(73) Assignee: Macrovision Corporation, Santa Clara, CA (US)

( * ) Notice: Subject to any disclaimer, the term of this patent is extended or adjusted under 35 U.S.C. 154(b) by 478 days.

(21) Appl. No.: 09/757,951

(22) Filed: Jan. 10, 2001

(65) Prior Publication Data

US 2001/0032187 A1   Oct. 18, 2001

Related U.S. Application Data

(62) Division of application No. 09/055,068, filed on Apr. 3, 1998, now Pat. No. 6,202,056.

(51) Int. Cl.
*G06F 17/60* (2006.01)
(52) U.S. Cl. .......................... 705/52; 705/75
(58) Field of Classification Search ............ 705/51–53, 705/14, 26–27, 35, 39, 44, 75–79; 709/201–203, 709/238; 707/9–10, 104; 380/25
See application file for complete search history.

(56) References Cited

U.S. PATENT DOCUMENTS

| | | | | |
|---|---|---|---|---|
| 4,658,093 A | * | 4/1987 | Hellman | 380/25 |
| 5,050,213 A | * | 9/1991 | Shear | 705/53 |
| 5,592,511 A | * | 1/1997 | Schoen et al. | 375/220 |
| 5,629,980 A | * | 5/1997 | Stefik et al. | 380/4 |
| 5,634,012 A | * | 5/1997 | Stefik et al. | 705/39 |
| 5,715,403 A | * | 2/1998 | Stefik | 705/44 |
| 5,765,152 A | * | 6/1998 | Erickson | 707/9 |
| 5,783,808 A | * | 7/1998 | Josephson | 235/379 |
| 5,870,562 A | * | 2/1999 | Butman et al. | 709/238 |
| 5,893,128 A | * | 4/1999 | Nauckhoff | 707/511 |
| 5,907,617 A | * | 5/1999 | Ronning | 705/52 |
| 5,910,987 A | * | 6/1999 | Ginter et al. | 380/24 |
| 6,202,056 B1 | * | 3/2001 | Nuttall | 705/52 |

FOREIGN PATENT DOCUMENTS

| | | |
|---|---|---|
| WO | WO 97/37492 | * 10/1997 |
| WO | WO 9809209 | 3/1998 |
| WO | WO 9810381 | 3/1998 |

OTHER PUBLICATIONS

"Secure Electronic Trading (SET)", Management Accounting-London, v75n3, p 45, Mar. 1997, ISSN: 0025-1682.*
Bernstein, et al., "Copyrights, Distribution Chains, Integrity and Piracy: The Need for a Standards-based Solution", Proceedings of the Knowright Conference, Proceedings of the International Congress on Intellectual Property Rights for Specialized Information, Knowledge and New Technology, p. 344, p. 350.

* cited by examiner

*Primary Examiner*—Mary D. Cheung
(74) *Attorney, Agent, or Firm*—Orrick Herrington & Sutcliffe, LLP

(57) ABSTRACT

A computer network having a requesting node and a providing node permits data transfer therebetween when permitted by an authorizing node. Reports generated in response to authorizations and reports generated in response to data transfers are reconciled at a reconciliation node to improve the accuracy of payments collected and paid for use of the data. Such payments include copyright royalties for audio, video, and other works recorded in digital format.

31 Claims, 19 Drawing Sheets

| Report | | | | | Reconciliation Result |
|---|---|---|---|---|---|
| A | B | C | D | E | |
| Y | Y | Y | Y | Y | Normal request/payment |
| Y | Y | N | N | X | Failed CRN |
| N | N | Y | X | X | Failed CRN |
| N | N | X | Y | X | Failed CRN |

Y = Yes
N = No
X = Don't Care

FIG. 5

| CONTENT FILE HEADER | 1400 |
|---|---|
| content.version | |
| content.title | |
| content.artist | |
| content.copyright | |
| content.date.recording | |
| content.size | |
| content.listen.begin | |
| content.listen.duration | |
| content.ID.code.type | |
| content.ID.code.number | |
| content.watermark.tech | |
| content.legal.duration | |
| content.file.number | |
| content.usage.counter | |
| content.CPN.node.address | |
| content.generation.number | |
| content.date.start.validity | |
| content.date.stop.validity | |
| content.encrypt.tech | |
| content.encrypt.key | |
| content.listen.price | |
| content.listen.currency | |
| content.copy.price | |
| content.copy.currency | |
| content.home.copy.price | |
| content.home.copy.currency | |

FIG. 14

| REQUEST |
| --- |
| request.map.pathname |
| request.access.mode |
| request.sound.quality |
| request.content.price |
| request.content.currency |
| request.CRN.node.address |
| request.CRN.username |
| request.CRN.password |
| request.CPN.node.address |
| request.CPN.product.name |
| request.CPN.product.number |
| request.CRN.node.address.transaction.number |

FIG. 15

| PERMIT |
|---|
| map.content.version |
| map.CPN.node.address.pathname.quality.level 1 |
| map.CPN.node.address.pathname.quality.level 2 |
| map.CPN.node.address.pathname.quality.level 3 |
| . . . |
| map.node.address.pathname.quality.level N |
| request.content.price |
| request.content.currency |
| permit.CPN.node.address |
| permit.AN.date.time |

| START REPORT |
|---|
| request.CRN.node.address.transaction.number |
| request.CRN.node.address |
| request.CRN.username |
| request.CRN.password |
| request.access.mode |
| start.report.date.time |
| content.title |
| content.artist |
| content.copyright |
| content.legal.duration |
| content.ID.code.type |
| content.ID.code.number |
| content.CPN.node.address |
| content.file.number |
| start.report.CRN.encrypt.key |
| request.content.price |
| request.content.currency |
| request.sound.quality |
| permit.map.CPN.node.address.pathname.quality.level[x] |
| start.report.CRN.timezone |
| start.report.CRN.language |
| start.report.CRN.keyboard |

| SUMMARY REPORT |
|---|
| request.CRN.node.address.transaction.number |
| request.CRN.node.address |
| request.CRN.username |
| request.CRN.password |
| content.ID.code.type |
| content.ID.code.number |

| ACCESS REPORT |
|---|
| content.title |
| content.artist |
| content.copyright |
| content.legal.duration |
| content.ID.code.type |
| content.ID.code.number |
| content.CPN.node.address |
| content.file.number |
| access.territory.rightowners |
| content.price |
| content.currency |
| request.CRN.node.address.transaction.number |

| DEBIT REPORT |
|---|
| content.ID.code.type |
| content.ID.code.number |
| content.CPN.node.address |
| request.CPN.product.name |
| request.CPN.product.number |
| debit.date.time |
| request.CRN.username |
| request.CRN.password |
| request.content.price |
| request.content.currency |
| request.CRN.node.address.transaction.number |

FIG. 20

METHOD FOR COMPUTER NETWORK OPERATION PROVIDING BASIS FOR USAGE FEES

This is a divisional application of U.S. patent application Ser. No. 09/055,068 filed on Apr. 3, 1998 and now U.S. Pat. No. 6,202,056 issued Mar. 13, 2001.

FIELD OF THE INVENTION

The present invention relates to computer networks for data transfer and to monitoring use of such data for example for fee accounting for usage rights.

BACKGROUND OF THE INVENTION

Publishers of information in digital form desire to prevent the unauthorized and unaccounted distribution or usage of electronically published materials. Electronically published materials are typically distributed in a digital form and recreated on a computer based system. Audio and video recordings, computer programs, books, and multimedia are examples of works that are suitable for publishing electronically. The sales revenue for companies in the electronic publishing and information systems industries includes payments based on an accounting for delivery of information in digital form, for example the sale of an audio CD at a retail outlet. Any unaccounted distribution of a work results in decreased revenue to the distributor and decreased royalty for the owner of usage rights in the work. For example, being able to copy an audio recording CD to another digital medium from which the audio can be retrieved and played circumvents payment for distribution from which royalty for copyright may have been due to the owner of rights in the work.

Owners of rights in electronically published works also desire to prevent the unauthorized and unaccounted distribution or usage of such materials. When records of the distribution and usage of a work are held exclusively by the distributor, falsification of records results in increased profit for the distributor and loss of royalty income for the owner of rights.

Unauthorized and unaccounted distribution can be curbed by preventing unauthorized copying of the work onto digital storage media and unauthorized transmission of the work over computer networks. Unauthorized and unaccounted usage can be curbed by preventing storage of the work for reuse or by monitoring the use of stored copies.

Existing systems and methods for preventing storage, transmission, and unmonitored use of digital works place a heavy burden of cost on the consumer desiring access to a work in digital form. The continued expansion of publication and use of works in digital form cannot remain within the policies for intellectual property protection (such as providing incentives to authors and publishers) without systems and methods for computer network operation that provide an accurate basis for usage fees.

SUMMARY OF THE INVENTION

A system for the control of distribution and use of digital works includes a distribution and usage reporting mechanism for accurately calculating fees associated with such distribution and use. The system operates according to a method for transferring data from a content providing node to a content requesting node. The method includes the steps of: (a) transmitting a first request to the content providing node, the first request for notifying an authorizing node; (b) receiving a permit from the authorizing node in response to the notification; (c) determining a file name in response to the permit; (d) transmitting to the content providing node a second request comprising the file name; (e) transmitting to an event reporting node a first report in response to receiving the permit; (f) receiving data from the file; and (g) transmitting to the event reporting node a second report in response to receiving the file.

By obtaining the permit without direct communication from the content requesting node and the authorizing node, manipulation of the authorizing node by the content requesting node is prevented. The content requesting node has an incentive to manipulate the authorizing node in order to receive unlimited authorization. The content providing node has an incentive to maintain proper authorization because revenues to the content providing node may be based on the number of authorized transfers.

Although a work may be identified in the request received at the content providing node, the content providing node may be prevented from obtaining information leading to the filenames that comprise the work. The content providing node may have an incentive to provide free transfers of the work for other commercial or personal use; however, by determining the file name in response to the permit and preventing access to the permit from the content providing node, the content providing node cannot identify particular files that correspond to a particular work.

By transmitting reports from the content requesting node to an event reporting node, modification of data transfer reports by the content providing node is prevented. Accurate records provide basis, for example, for fees payable to owners of rights in the work.

By transmitting a first report prior to data transfer and a second report after data transfer, a duration of the usage of the data may be used as a basis, for example, for revenues to distributors and payments to owners of rights. Falsification of the duration of usage by the content requesting node is prevented.

BRIEF DESCRIPTION OF THE DRAWING

FIG. 5 is a table of outcomes for lost transmissions of reports.

FIG. 14 is a memory map of a data structure of a header of a content file of the present invention.

FIG. 15 is a memory map of a data structure of a request of the present invention.

FIG. 16 is a memory map of a data structure of a permit of the present invention.

FIG. 17 is a memory map of a data structure of a start report of the present invention.

FIG. 18 is a memory map of a data structure of a summary report of the present invention.

FIG. 19 is a memory map of a data structure of an access report of the present invention.

FIG. 20 is a memory map of a data structure of a debit report of the present invention.

DETAILED DESCRIPTION OF THE PREFERRED EMBODIMENTS

Data transfer in the present invention is illustrated among computer systems using a communication network. A communication network of the present invention includes at least one computer system at each of several network nodes. Each node is coupled by a link from time to time for communication with other nodes of the network. Each link includes conventional computer communication technology of the type including, for example, local area, wide area, dedicated telephone, or satellite services and including conventional data communication hardware and software. The popular computer networks known as the Internet, World Wide Web, and National Information Infrastructure are examples of such a communication network having nodes possibly at physically separate locations and addressed by a node address, for example a uniform resource locator (URL), a name from a domain name system (DNS), or an Internet Protocol address (IP).

Figure 1:
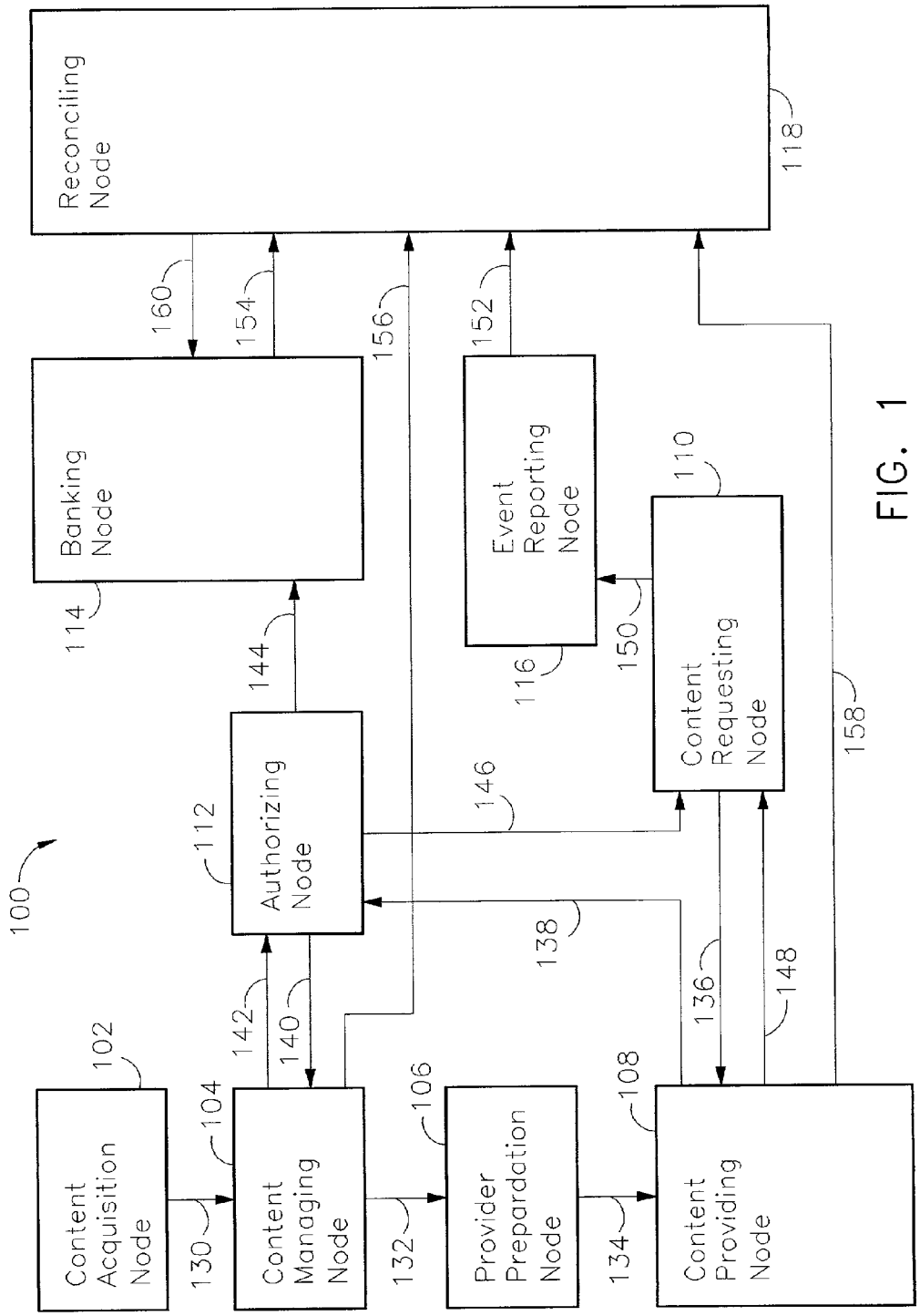
FIG. 1 is a block diagram of a network in one embodiment of the present invention.

Communication network 100 of FIG. 1 includes computer systems, each shown in a block, that communicate for data transfer. Communication of messages is illustrated by one or more lines between blocks, though it is apparent that one communication link between any two blocks is sufficient for any number of message lines. Practice of variations of the invention is independent of whether such a link is maintained continuously, as in a dedicated line, or is maintained for the duration of the message as in some public multiple access facilities.

Communication technology provides known mechanisms and computer software for message transfer. This technology surrounds the message content data with other data that provide a mechanism for various purposes including tracking messages, synchronizing equipment, and assuring accurate and secure transfer of message content data. In the description that follows, digital works are transferred between nodes. The term "content," therefore, refers to a digital work or a portion thereof.

Network 100 includes content acquisition node 102, content managing node 104, provider preparation node 106, content providing node 108, content requesting node 110, authorizing node 112, banking node 114, event reporting node 116, and reconciling node 118.

In operation, for content to be transferred on request to any of perhaps millions of content requesting nodes, the content is first received from a source and formatted for storage on one or more of perhaps thousands of content providing nodes. Initially, a content developer, publisher, or distributor provides digital works, for example multimedia files, to content acquisition node 102 for encoding in a format efficient for storage and access by content managing node 104. Content is conveyed on line 130 as it becomes available for management by content managing node 104. Content from content managing node 104 is conveyed on line 132 and then made unique to each content providing node 108 by formatting processes performed by provider preparation node 106. Content providing node 108 receives content from time to time from provider preparation node 106 on line 134.

To request a data transfer in a preferred embodiment for the Internet, a user or consumer at content requesting node 110 uses a network browser, such as Microsoft Internet Explorer, and follows an Internet link (clicks on a portion of an HTML file display), causing a message in HTTP format to be conveyed on line 136 to content providing node 108. Content providing node 108 forwards the request on line 138 to authorizing node 112. If the request is valid, authorizing node 112 creates a permit and sends it on line 146 to content requesting node 110. A permit is a message created to uniquely respond to the request from a particular content requesting node. Using portions of the permit, content requesting node 110 requests on line 136 particular files from content providing node 108. In response, such particular files are conveyed on line 148 to content requesting node 110, completing the data transfer.

Accounting for the above described transfer of content includes, for example, receiving payment from the user of content requesting node 110, making payment for distribution services to at least the operator of content providing node 108, and making payment to one or more owners of rights in the content. These accounting transactions find accurate basis in a reconciliation of reports from a variety of network nodes and reported at separate times during the data transfer process. For example, when authorizing node 112 receives the request and queries an access authority data base on content managing node 104 via lines 140 and 142, content managing node 104 logs the query and reports the log on line 156 from time to time to reconciling node 118. With knowledge of the identity of content requesting node 110, an identity of the user, and a price of the requested work for a requested purpose (for example, copy or preview), authorizing node confirms a debit of an account kept on banking node 114 by messages conveyed on line 144. Banking node 114 logs the debit and reports the log on line 154 from time to time to reconciling node 118. When the data transfer begins and again when at least some of the data has been transferred, content requesting node 110 reports on line 150 to event reporting node 116. Event reporting node 116 logs the events and from time to time reports the log on line 152 to reconciling node 118. By comparing reports received on lines 152, 154, 156, and possibly 158 (from content providing node 108), reconciling node distinguishes valid complete data transfers from incomplete transfers and from events that could indicate intentional interference with the integrity of network 100. For each valid complete transfer, reconciling node allocates revenues generated from the debits of users' accounts, discussed above with reference to line 144. Reconciling node then initiates funds transfers with messages to banking node 114 on line 160 for payments of, for example, distribution fees and royalties.

Each node of network 100 may represent more than one conventional computer system that performs, inter alia, methods of the present invention. Multiple computers or multiple data storage devices may be necessary for maintaining a particular node's functions operational in periods of high network traffic. Such multiple computers may be at various physical locations, provided that only one network node address (for example, an IP address) is associated with each node.

A method of the present invention for preparing content for storage on a content providing node includes separation of content and map information. When content is divided for convenience into several files in a conventional file storage system, map information identifies the particular files from the entire inventory on the storage system and the order of presentation of the files for reconstituting a particular work. Separation of content and map information facilitates security measures without unduly compromising rapid provision of a work or performance of a work on a content requesting node.

Figure 2:
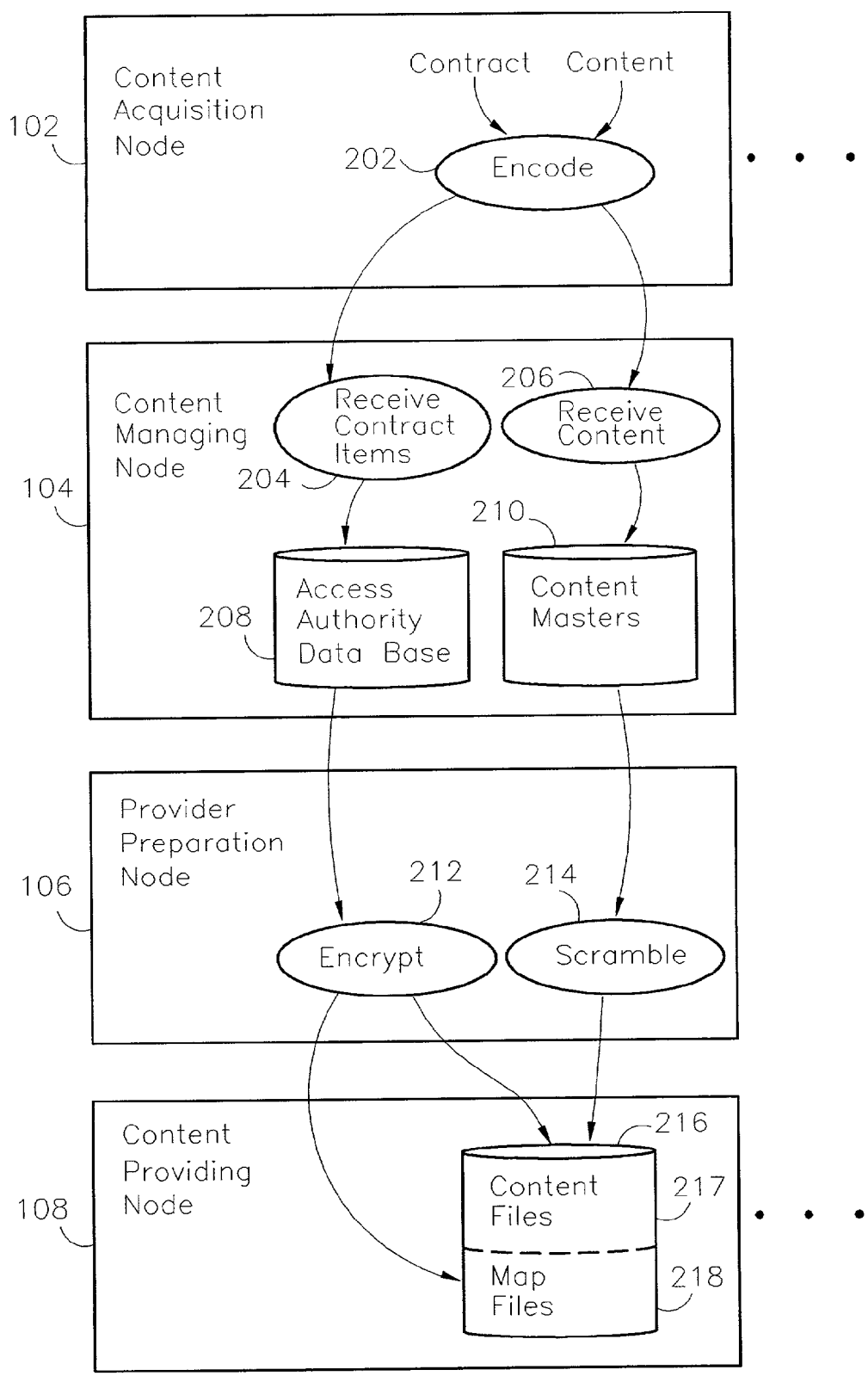
FIG. 2 is a data flow diagram for a portion of the network of FIG. 1 that, inter alia, creates content files on a content providing node.

For example, as shown in FIG. 2, content acquisition node 102 encodes (using conventional data formatting and compression technology) contract items associated with the work and encodes the work itself. When the work is primarily an audio recording, contract items may additionally include: name of the album, producer, label, publisher, mail order company, publishing year, bar code, album and track distribution levels, title of a track, performers, authors, composers, ISRC code for the title, language, track number, duration, extract start and end times, number of allowed copies, price to preview (listen), price to make copy, rights collecting societies, authorized distribution areas, album cover picture, liner notes, other graphics, music style, associated country, and possibly pictures associated with the recording and text to be shown while the work is being played. Receiver processes 204 and 206 (using conventional communication and data storage technology) on content managing node 104, receive the encoded contract items and content and store each respectively on access authority data base (AADB) 208 and content masters store 210.

When a particular content providing node 108 is identified, works to be provided by that node are selected from content masters store 210 and scrambled by process 214 (using conventional data security technology). Scrambling is a preferred (though weak) form of encryption that allows some security without unduly burdening data transfer or use of the work when requested. The scrambled result of a work is combined with a header, which includes encrypted data from access authority data base 208, to form one or more content files. Content files 217 are transferred for storage on store 216 of content providing node 108.

Process 212 prepares map files 218 for transfer and storage on store 216. Descriptors of the work, of the content files, and of content providing node 108 are obtained from AADB 208 and formatted and encrypted by process 212 (using conventional data formatting and encryption technology). Some or all of the descriptors, alone or in combination, may be subject to rigorous encryption. The map file permits content file locations to be random or at least unpredictable in store 216, substantially decreasing the likelihood of unauthorized access without the system performance penalties associated with encrypting a content files 218 on store 216.

Figure 13:
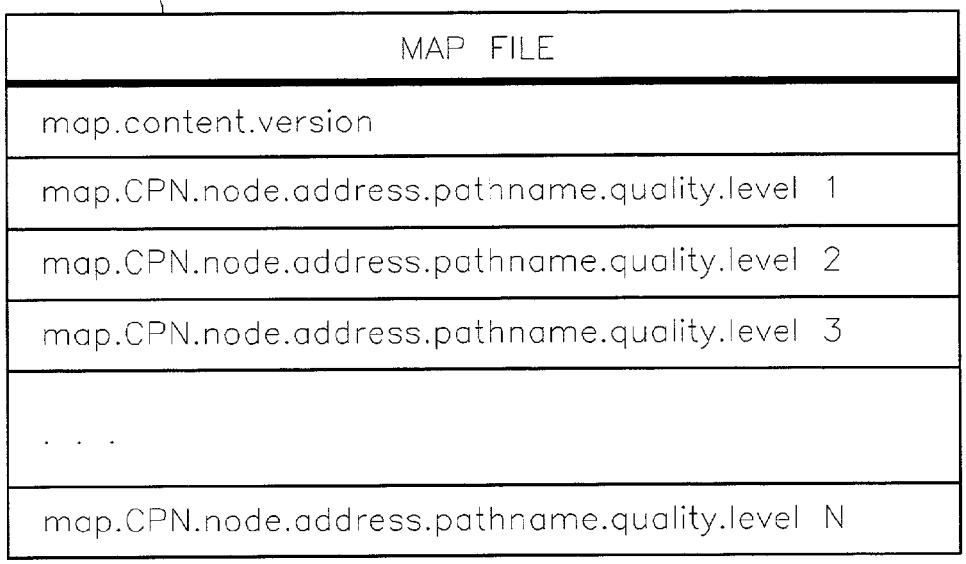
FIG. 13 is a memory map of a data structure of a map file of the present invention.

In a preferred embodiment for an audio recording, the map file includes a version number of a group of content files and a node address and pathname to each content file of the group. The node address corresponds to the unique node address of the content providing node for which content files are being prepared. Each node address and pathname is encrypted separately. Each content file of the group provides a different level of sound quality for the same audio material. Different levels of quality provide, for example, flexibility in meeting the audio fidelity of different content requesting nodes. FIG. 13 illustrates an example map file data structure 1300 when instantiated in memory at provider preparation node 106. FIG. 14 illustrates an example data structure 1400 of a header of a content file when instantiated in memory at provider preparation node 106.

Content files 217 and map files 218 are organized for convenient access on store 216 using a conventional file system such as a directory system, shadowed physical drives, or a RAID system.

As indicated by ellipsis in FIG. 2, many content acquisition nodes may supply content to content managing node 104. Many content providing nodes may be supplied with content files from content managing node 104. Due to differing security and traffic support requirements, it is preferred to operate network 100 with physically separate nodes 104 and 106. In a variation, the functions of nodes 104 and 106 may be combined on one node or combined with content acquisition node 102.

Various methods of the present invention for data transfer use to advantage (a) the cooperation of several network nodes, (b) linking a request through a registered node, (c) creating a permit using data from multiple sources, (d) using encryption, current time of day, or encryption keys based on unique properties of a node, and/or (e) providing unique structures and separate access to content files and map files. These features, inter alia, accomplish validating the request, validating the permit, and validating the data transfer operation itself. When validation is unsuccessful, data transfer is stopped, preserving the integrity of network 100. The integrity of network 100 may be compromised by unauthorized copying, transfer, or use of a digital work.

Figure 3:
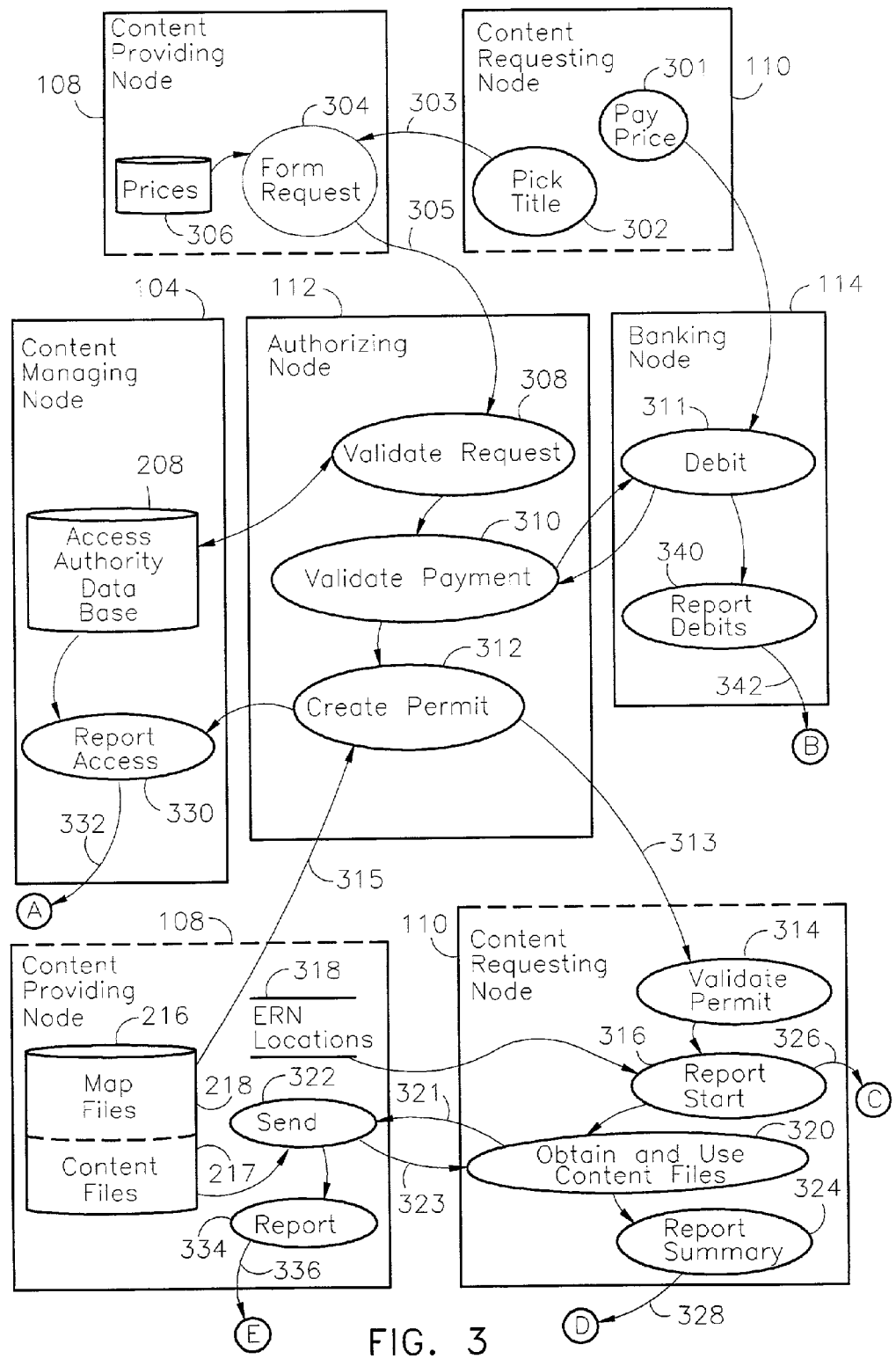
FIG. 3 is a data flow diagram for a portion of the network of FIG. 1 that, inter alia, satisfies a data transfer request.

For example, as shown in FIG. 3, a data transfer begins at content requesting node (CRN) 110. There a consumer or service user obtains a listing of titles, each title for a digital work. Process 302 (using a conventional browser and operating system) responds to user input, for example a mouse switch closure ("click") when an on-screen cursor points to a portion of an HTML page identifying a title, and in the conventional manner generates a message 303 to content providing node (CPN) 108. Process 304 (using conventional HTTP message technology) forwards the request 305 to authorizing node (AN) 112. FIG. 15 illustrates an example request data structure 1500 when instantiated in memory at authorizing node 112. In a variation, process 304 determines the price to be billed for the request type and title and includes price and price currency with the forwarded request. Price information is stored in file 306 which is available for editing by the operator of content providing node 108. In a preferred embodiment, validate payment process 310 obtains price information via the associated map file from each content file after the validity of the request has been determined.

Figure 6:
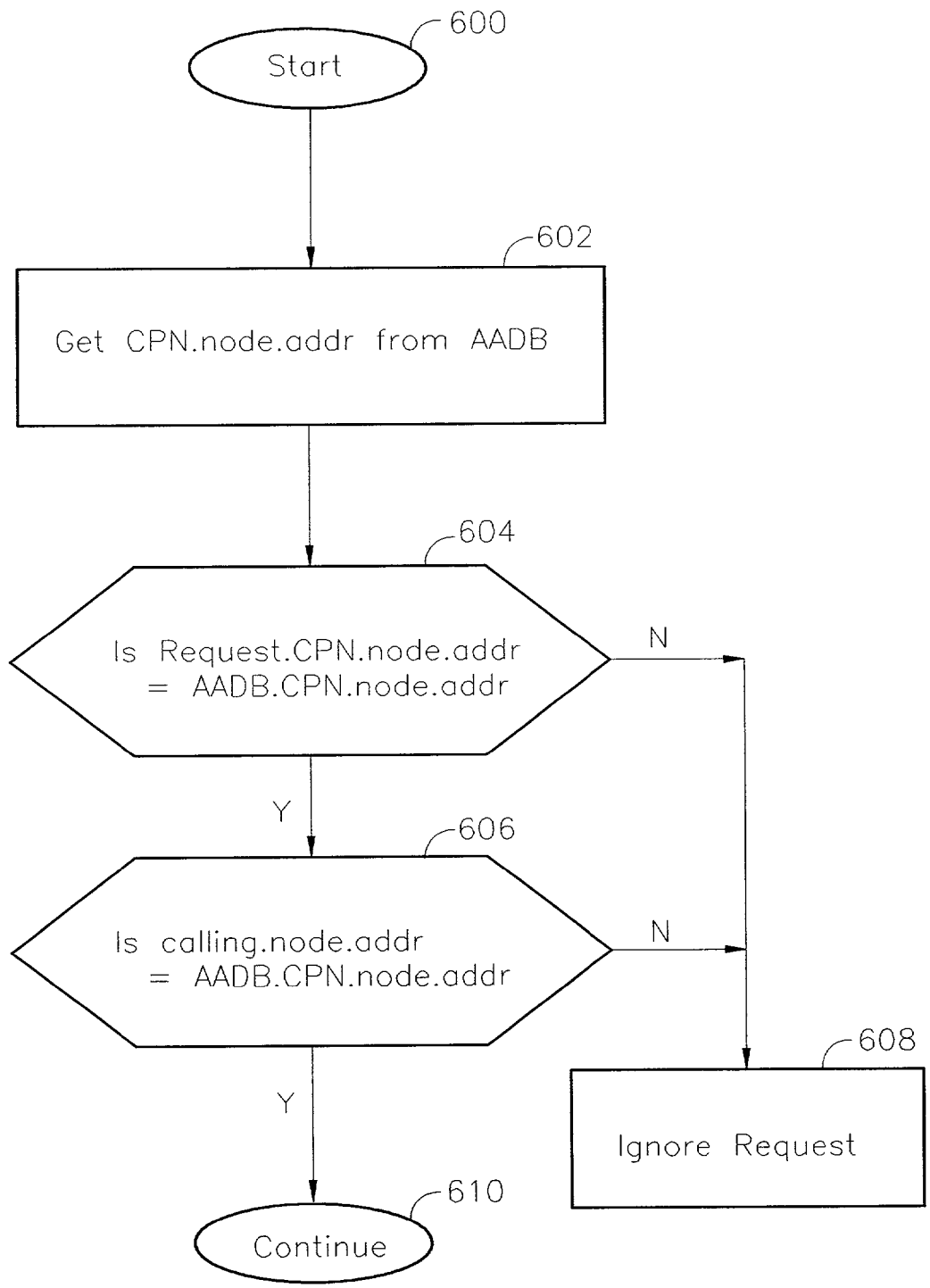
FIG. 6 is a functional flow diagram for a portion of a method of validating a request by an authorizing node.

Process 308 validates the request by denying further processing to requests that do not meet predetermined criteria. In one variation, shown in FIG. 6, process 308 includes the steps beginning at step 600. At step 602, the node address of content providing node (CPN) 108 is obtained from access authority data base (AADB) 208. At step 604, the CPN node address as provided in request 305 is compared to the CPN node address as provided from AADB 208. If a match is found, control passes to step 606, else to step 608 where the request is ignored. At step 606, the node address of the calling page (which contains the link that was followed by process 302) is compared to the CPN node address provided by AADB 208. If a match is found, the request is considered valid and control passes to process 310, else to step 608 where the request is ignored.

Process 310 (using conventional data base and communication technology) validates payment by the user by confirming that the user (via pay price process 310) has made a proper debit on the user's account. If a debit cannot be confirmed, request 305 is ignored. If confirmation of the debit transaction is successful, control passes to process 312.

Figure 7:
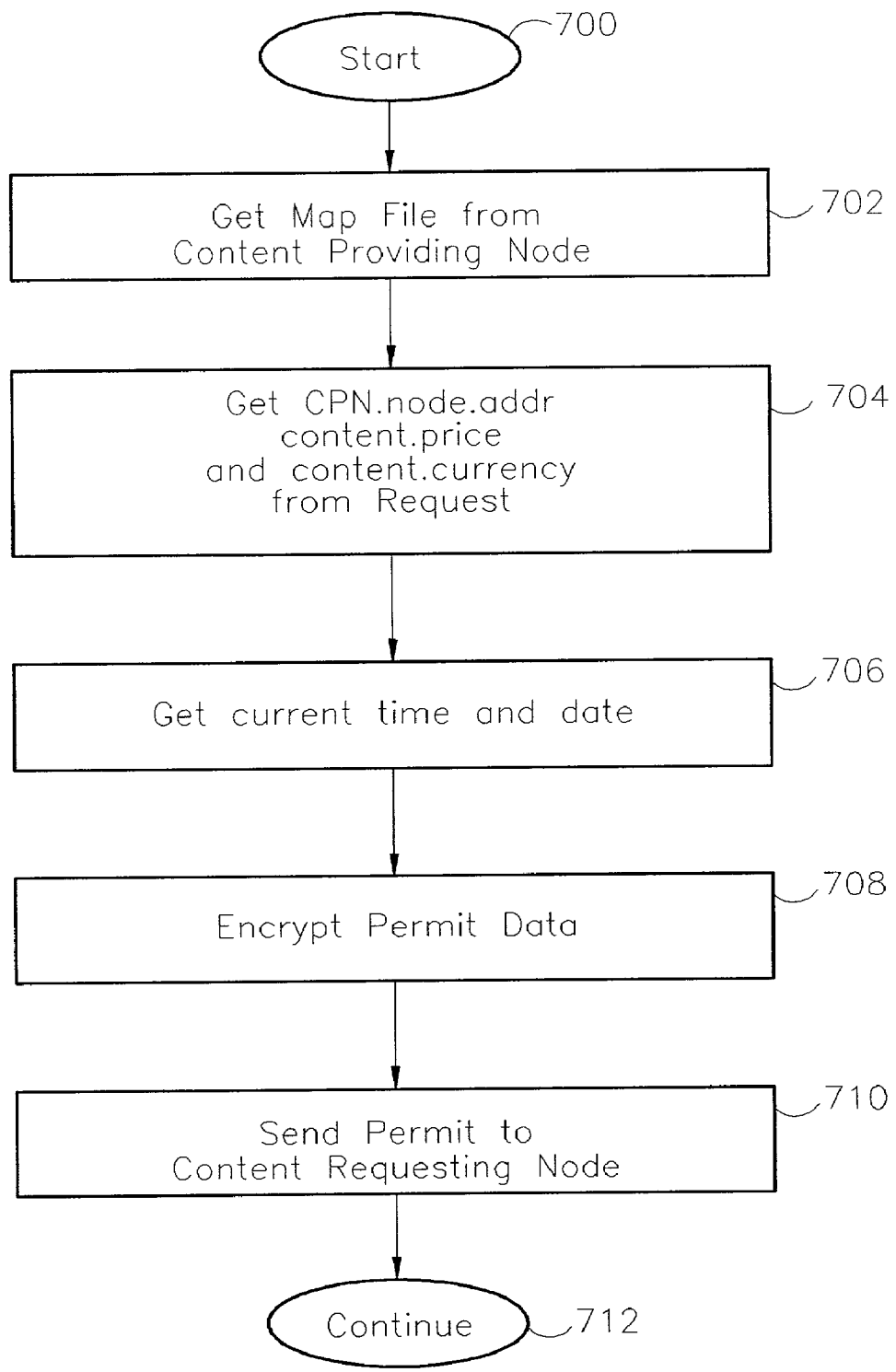
FIG. 7 is a functional flow diagram for a portion of a method of creating a permit by an authorizing node.

Process 312 creates a permit by combining information from more than one source. In one variation, shown in FIG. 7, process 312 includes the steps beginning at step 700. At step 702, a map file 315 for the requested content is obtained either from the request or from store 216 on content providing node 108. At step 704, content providing node address, content price, and price currency are obtained from request 305. At step 706, local date and time are obtained from the authorizing node 112. These data items are arranged, for example, in data structure 1600 instantiated in memory of authorizing node 112, as illustrated in FIG. 16. At step 708 some or all data in permit data structure 1600 are encrypted to provide permit 313. At step 710, permit 313 is sent to content requesting node 110.

Figure 8:
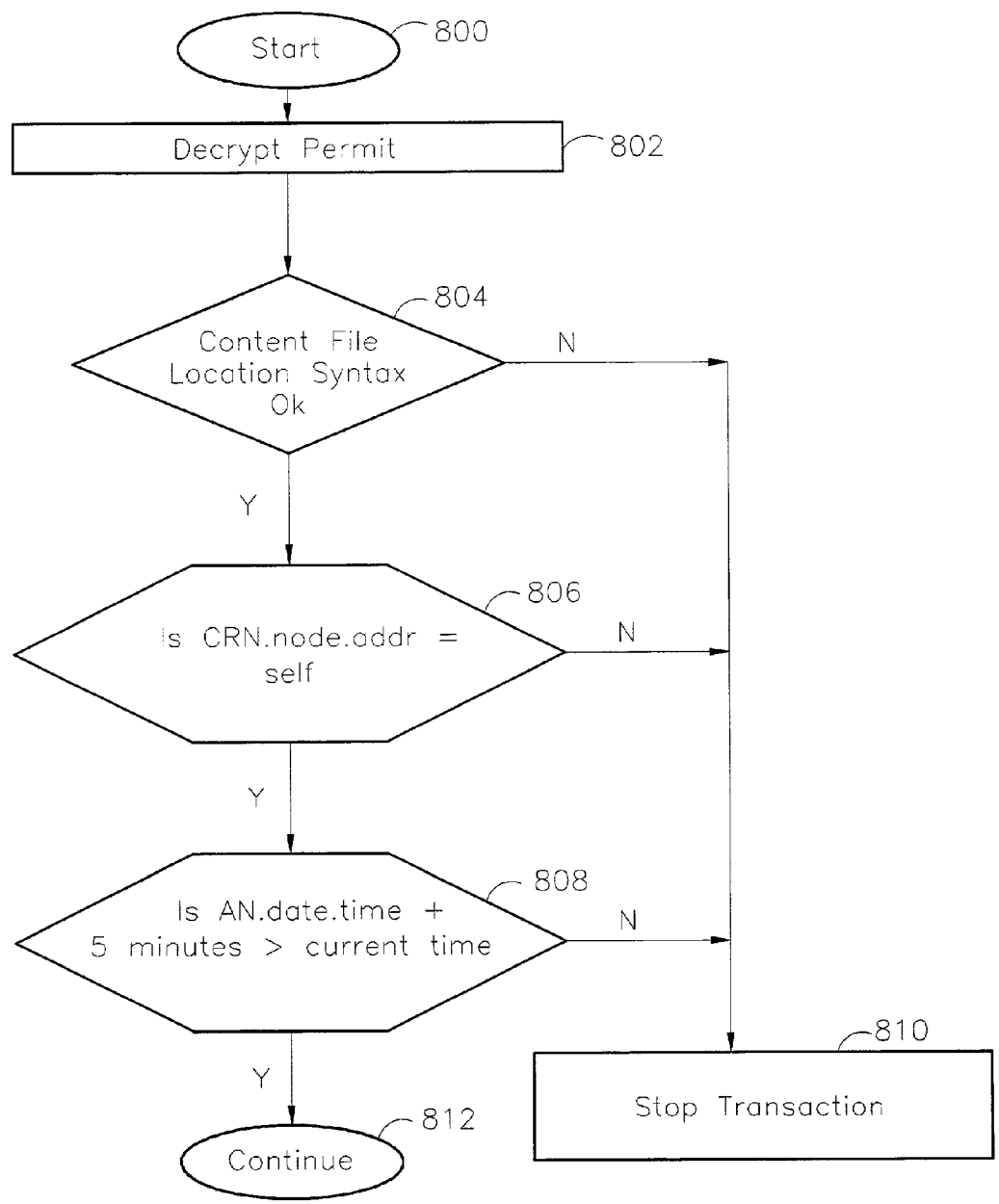
FIG. 8 is a functional flow diagram for a portion of a method of validating a permit by a content requesting node.

Process 314 validates the permit by stopping the transaction for permits that do not meet predetermined criteria. In one variation, shown in FIG. 8, process 314 includes the steps beginning at step 800. At step 802, that portion of the permit that is encrypted is decrypted. At step 804, the syntax of each content file location (content.CPN.node address-.pathname) is checked. The several pathnames in the permit provide ready access to the content file matching the sound quality level specified in request 305 (see FIG. 15, request-.sound.quality). If the syntax check fails, control passes to step 810 to stop the transaction. Otherwise control passes to step 806 where the content requesting node address provided in permit 313 is compared to the node address of content requesting node 110. If no match, control is transferred to step 810. If a match is found, control passes to step 808, the current date and time on content requesting node 110 is compared to the date and time value stamped by authorizing node (AN) 112 on permit 313 (AN.date.time). If the current time is more than a predetermined amount (for example, 5 minutes) after AN.date.time, then control passes to step 810 and the transaction stops. Otherwise, control passes to step 812 and, in due course, to process 316.

Process 316 reports the start of a data transfer between content providing node 108 and content requesting node 110. Generation of the report may occur before data transfer actually starts or during an initial phase of data transfer. A start report is made to one or more event reporting nodes as specified by a list on content providing node 108. The report is transmitted by packet message techniques on a separate port so as to avoid interference with the data transfer itself which may be underway on another port. The two ports may share the same communication hardware such as a single line to an Internet Service Provider, as is well known in applications of TCP/IP. For other communication hardware and software configurations, concurrent ports may be arranged on two or more hardware communication links.

Figure 9:
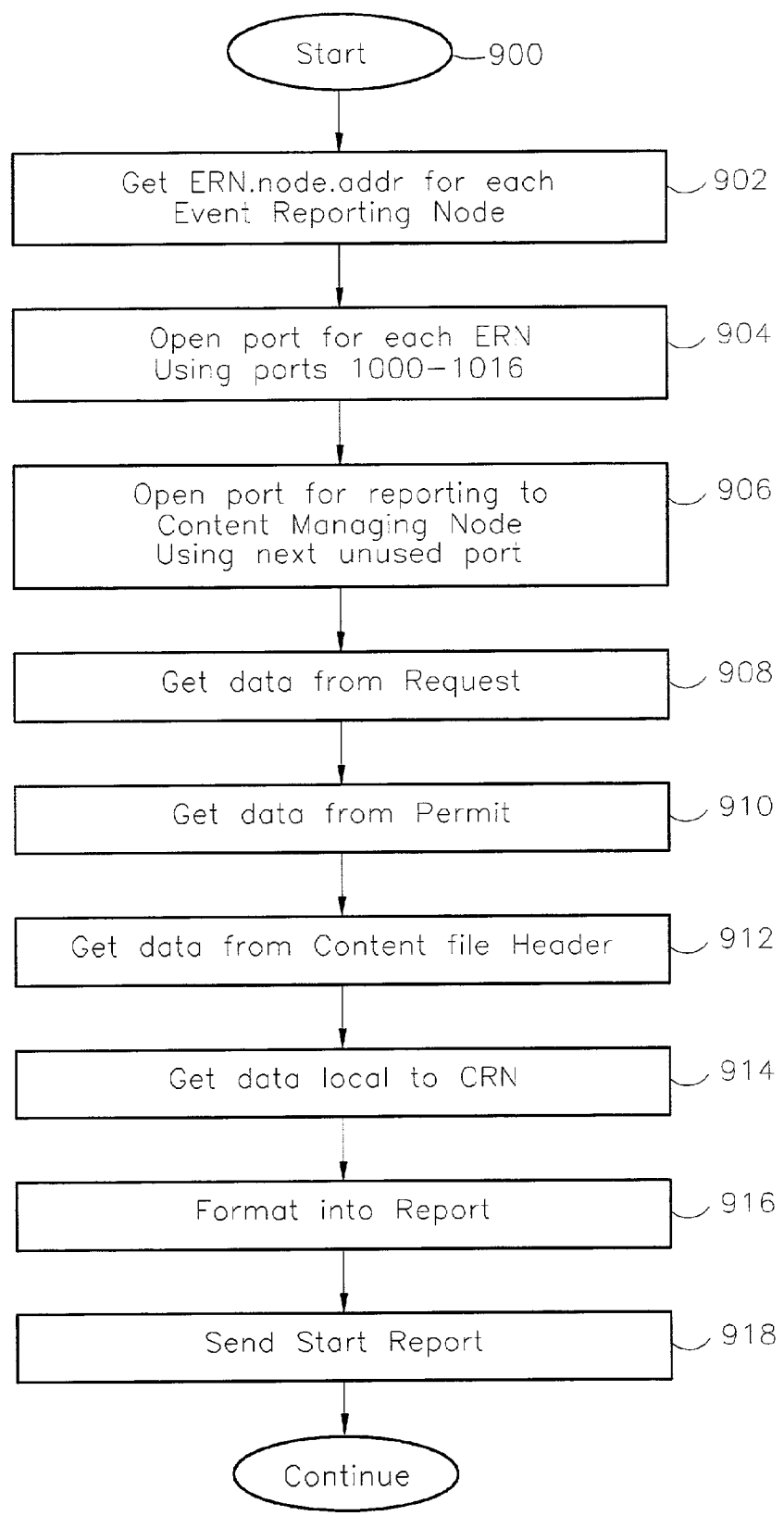
FIG. 9 is a functional flow diagram for a portion of a method of reporting, by a content requesting node, a start of data transfer.

In one variation, shown in FIG. 9, process 316 includes the steps beginning at step 900. At step 902, one or more event reporting node addresses are obtained from list 318 on content providing node 108. At step 904, a port is opened for each event reporting node on list 318. In a preferred embodiment, ports 1000 through 1016 are used, although other port numbers may be equivalently accommodated by the communication software on content requesting node 110. If no event reporting node successfully responds after attempts have been made to couple it for communication, then either the transaction is stopped or the transaction continues without the capability to generate reports. At step 906, a port is opened for reporting to content managing node 104, using the next available port number from the range 1000 through 1016. At step 908, information from request 305 is obtained and placed in a data structure in memory. FIG. 17 illustrates a start report data structure 1700 when instantiated in memory at content requesting node 110. For data structure 1700, such data includes the content requesting node address, the username and password, and the price, currency, and specified sound quality. At step 910, data from permit 313 is added to the start report data structure. For data structure 1700, such data includes the content file location for the specified sound quality level, i.e. a corresponding content.CPN.node.address.pathname.quality.level. At step 912, data from the content file header is added to the start report data structure. For data structure 1700, such data include the title, artist, copyright, duration, ID.code.type (whether ISRC, ISWC, or etc.), the ID.code.number, the content providing node address, and a file number (a serialized number assigned by encoding process 202). At step 914, local values of the content requesting node are added to the start data structure. For data structure 1700, such values include a transaction number for discriminating reports from the same user, the current date and time, an encryption key unique to the content requesting node, and values from which the country in which content requesting node 110 is located. These later values include in one variation of the present invention, the time zone, the language identified by the operating system of node 110 and the keyboard identified by the operating system of node 110. Country location is important to allocating royalties under the laws that vary from one jurisdiction (country) to another. At step 916, the report is placed in final format using conventional techniques and at step 918 it is sent to each event reporting node, for example node 116, and to content managing node 104.

Figure 10:
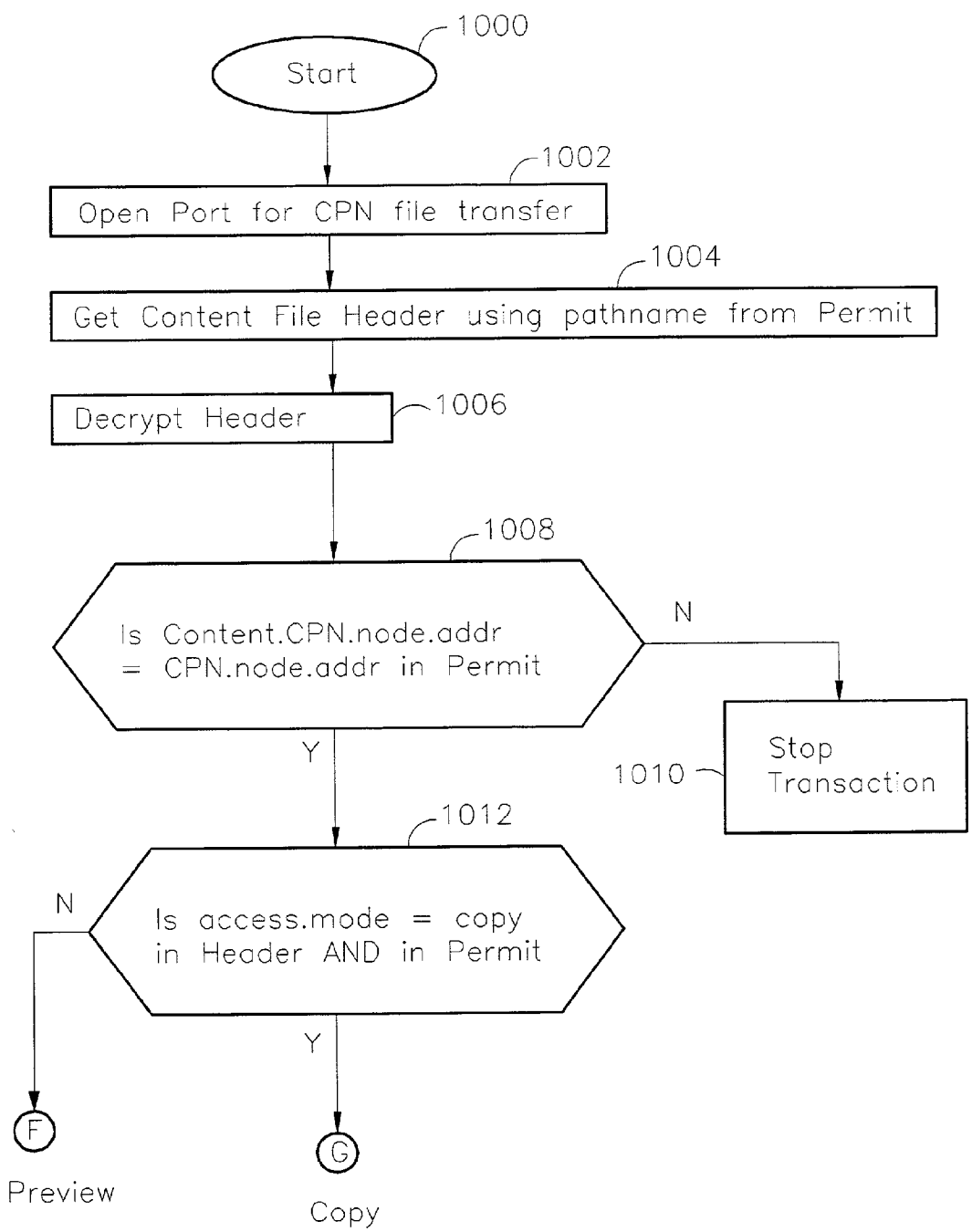
FIGS. 10 through 12 are functional flow diagrams for portions of a method of obtaining and using content files and reporting a summary of data transfer.

Process 320 obtains and uses the requested content files. After a content file header has been received by process 320, the transaction may be stopped if contents of the header do not compare favorably with the permit. In one variation, a summary report is prepared before data transfer of all requested files is complete. In a second variation, a duration of use of the files is measured and reported in a summary report, prepared and sent after all files have been received or usage is determined to be substantially completed. In the later case, shown in FIG. 10, process 320 includes the steps beginning at step 1000. At step 1002, a port is opened for content provider node file transfer (in addition to ports opened for reporting as discussed above). At step 1004, the header of the requested content file is obtained. The pathname to this content file is provided in permit 313 for a corresponding sound quality of content requesting node 110. After decrypting the pathname itself, at step 1006, the header of the specified content file is decrypted. At step 1008, if the content providing node address in the obtained content file header does not match the content providing node address as permitted, the transaction stops at step 1010. Otherwise, control passes to step 1012.

Figure 11:
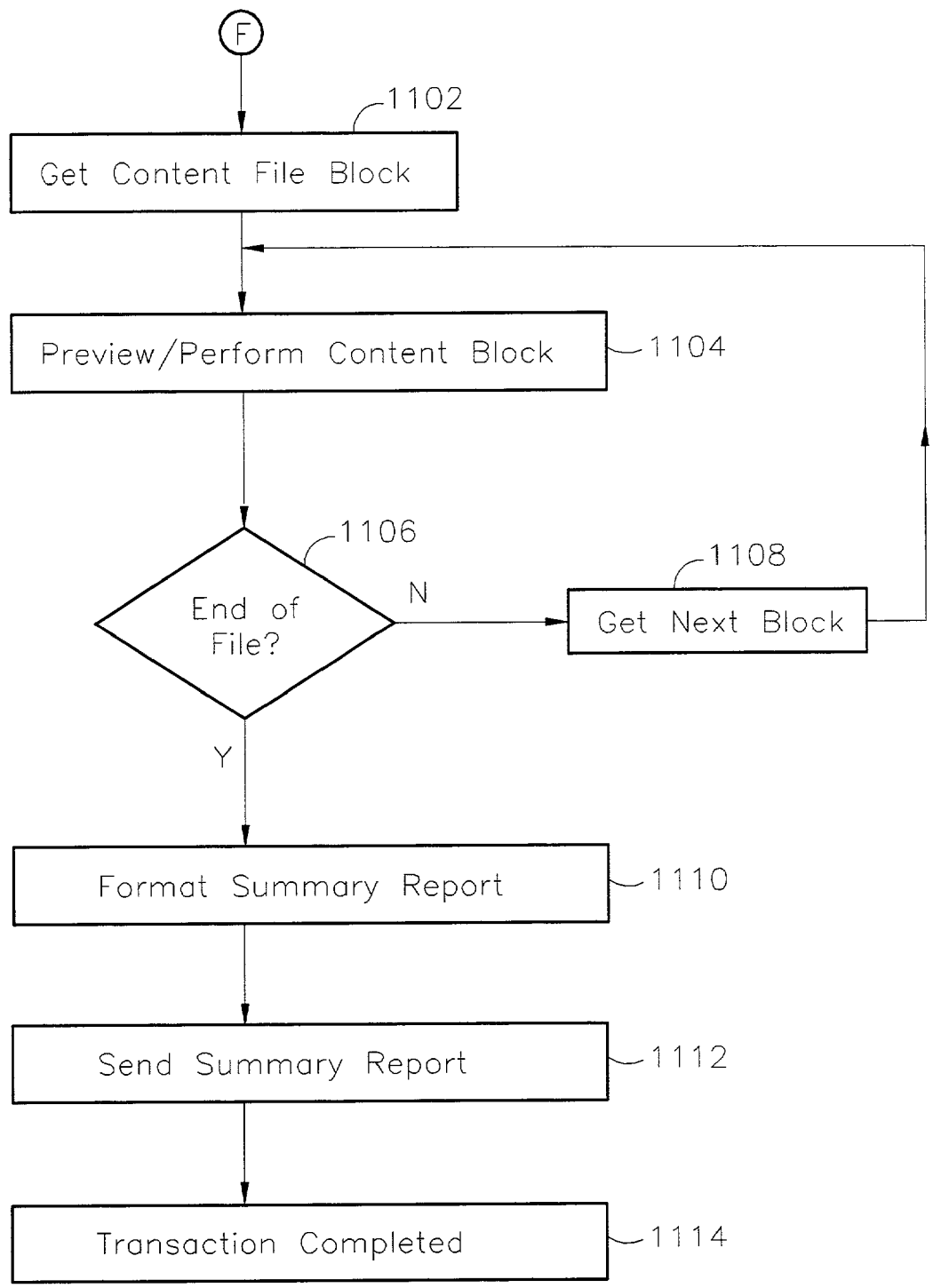
Figure 12:
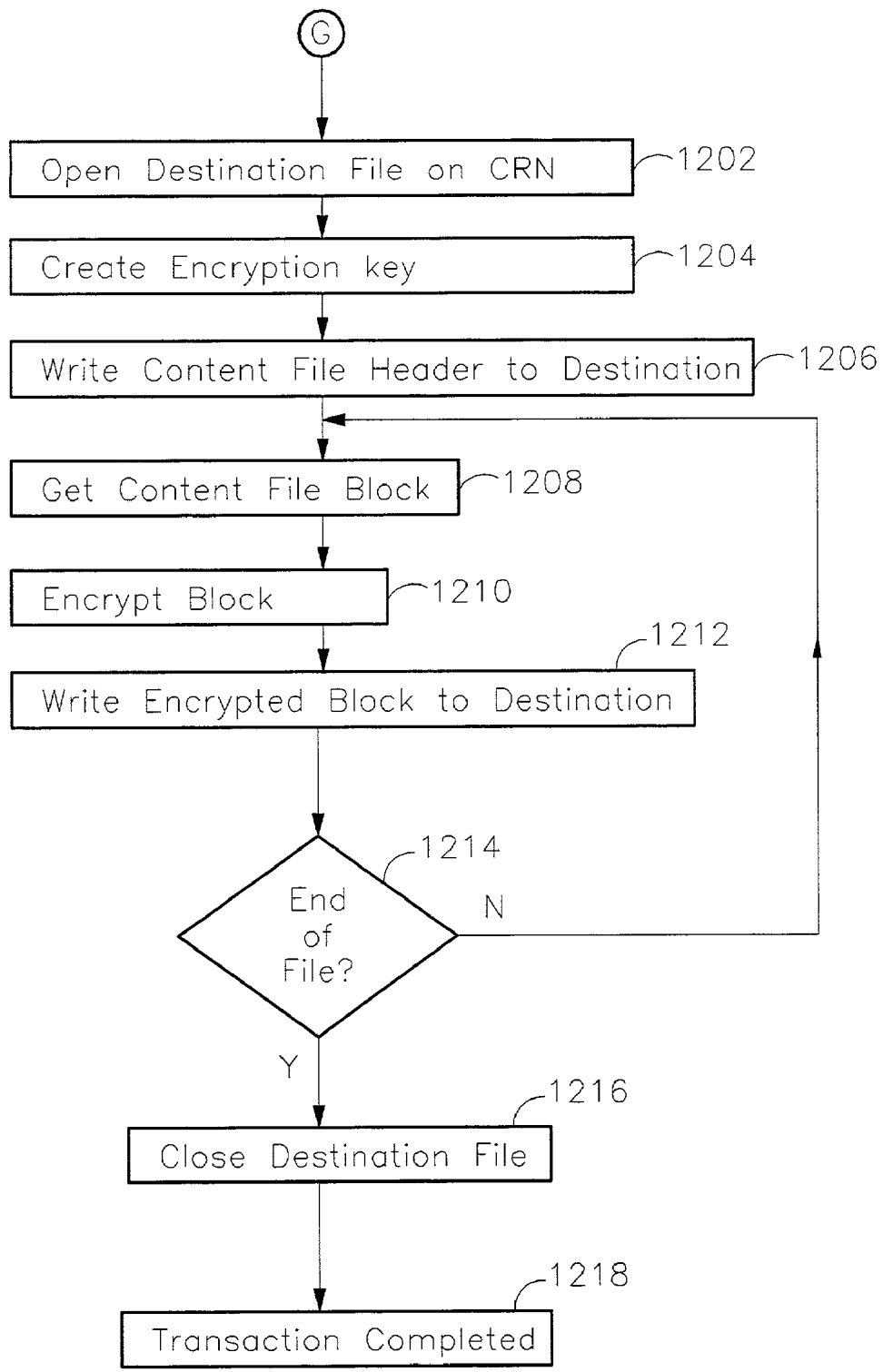

At step 1012, the usage mode as permitted is compared to the usage mode as requested. The user specifies a usage mode at the time of picking a title for a digital work to facilitate calculation of an appropriate price. For example, in many cases, the price for previewing a work (as in listening to a portion of an audio work) is less than the price for making a copy of a work for unlimited use. If the requested and permitted usage modes both indicate a copy is to be made, that is, the data transferred will be stored for repeated use, then control passes to step 1202 on FIG. 12. Otherwise, control passes to step 1102 of FIG. 11. Steps 1102 through 1108 obtain all subsequent blocks of the requested content file and, after each block is received, perform the digital work according to the data in that respective block. Unscrambling of the data may be required. Performance or preview may be, for example one or more of the following: playing audio, showing visual, performing multimedia, or executing computer program digital works. For example, when an audio file is being received, unscrambling is performed and the resulting data may be played without interruption.

At step 1110, information from several sources is combined to form a summary report. One purpose of the summary report is to indicate for purposes of reconciliation, the duration the digital work was being performed. FIG. 18 illustrates a summary report data structure 1800 when instantiated in memory at content requesting none 110. For summary report 328, data items from start report structure 1700 (having the same names) are formatted in summary report data structure 1800. At step 1112, the summary report is sent through ports opened in steps 902 and 904 to one or more event reporting nodes. The transaction is completed at step 1114.

If at step 1012, a copy of the work has been permitted, control passes to step 1202. At step 1202, a destination file for receiving the digital work is opened on the content requesting node 110. At step 1204, an encryption key is prepared using conventional data security technology. At step 1206, the content file header is obtained and written to the destination file. At steps 1208 through 1214, each block of the requested content file is obtained, encrypted, and written to the destination file. At step 1216, the destination file is closed. At step 1218 the transaction is completed.

From time to time, reports are generated by various nodes for checking the integrity of network 100 and for allocating revenues received by debiting user accounts as described with reference to FIG. 3 process 310. Five reports are provided in network 100. Access report 332 is provided by content managing node 104 from queries of AADB 208 initiated by authorizing node processes 308 through 312. FIG. 19 is a memory map of data structure 1900 of an access report record when instantiated in memory of content managing node 104 or reconciling node 118. Report 342 is provided by banking node 114 from debit transactions requested by process 310 of authorizing node 112. FIG. 20 is a memory map of a data structure of a debit report record when instantiated in memory of banking node 114 or reconciling node 118. Reports 326 and 328 respectively provide the start and summary information from content requesting node 110. Data structures 1700 and 1800 correspond to a single record of the start report and summary report respectively when instantiated in memory of reconciling node 118. Finally, report 336 may be generated by content providing node 108.

Each report consists of multiple records, each record having multiple fields. Because these reports have some fields in common, comparison of the data in identical fields ("reconciliation") provides the basis for distinguishing valid complete transactions from interrupted and unauthorized transactions. For example, an access report record 1900, debit report record 2000, start report 1700, and summary report 1800 each include a tracking field for the value: request.CRN.node.address.transaction.number. By noting whether all four records having the same value for this tracking field have been received at reconciling node 118, conclusions about network integrity and allocation of funds can be reliably made.

A method for reconciling reports of the present invention includes accommodations for high volume event report processing. In addition, reconciled reports may be used to identify nodes having suspect operations and thereby provide a way of detecting unauthorized copying and use of digital works.

In combination with the operation of the AADB 208, unauthorized use may be blocked. For example, if unauthorized transactions frequently involve the same content providing node address, that node address may be deleted from the list of registered content providing nodes by an appropriate operation on AADB 208. When a content requesting node makes a request through the link at the offending content providing node address, the request will be denied at the authorizing node.

Figure 4:
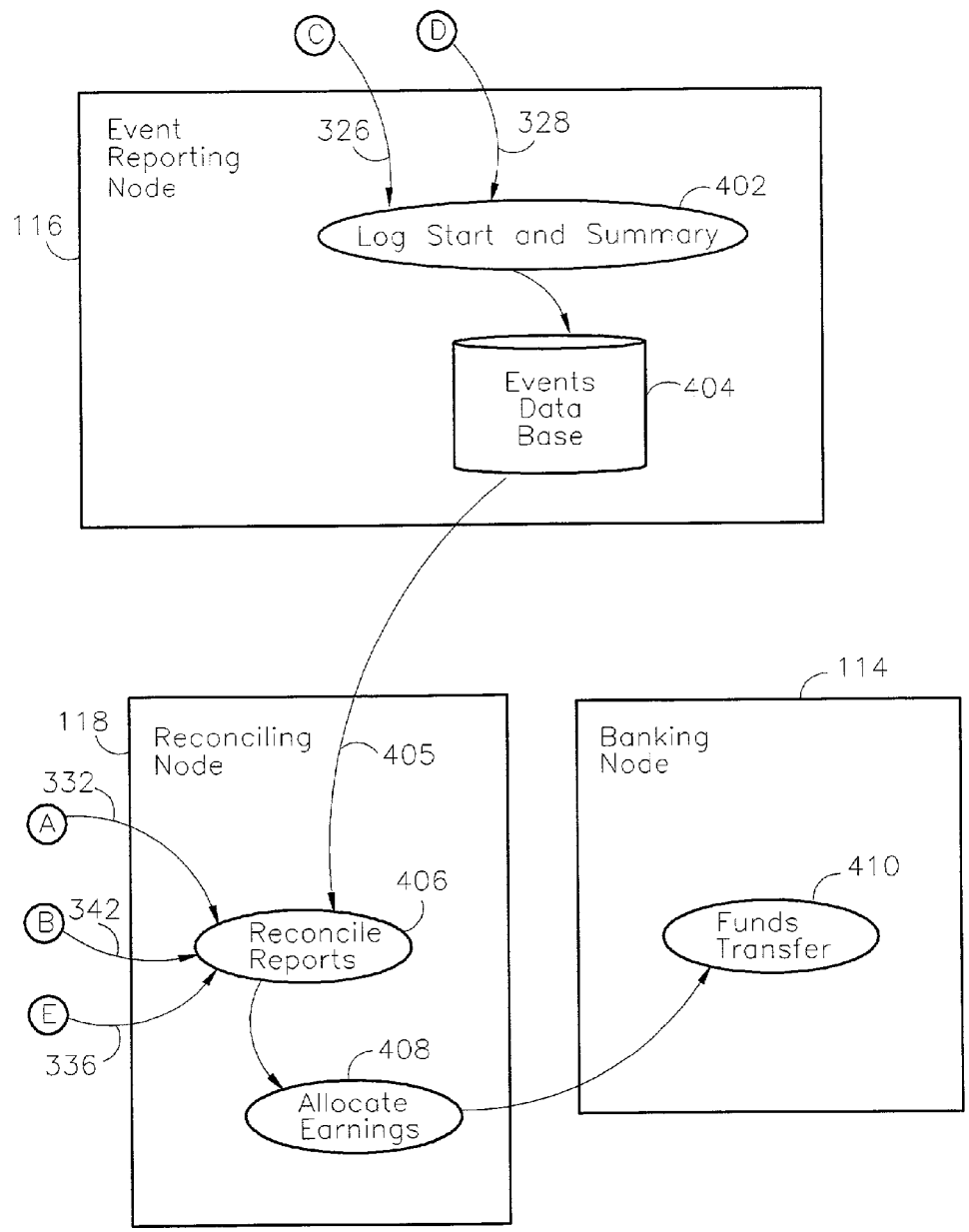
FIG. 4 is a data flow diagram for a portion of the network of FIG. 1 that, inter alia, accomplishes payments, for example, to owners of rights in data transferred.

An example of a reconciliation method of the present invention is illustrated in FIG. 4. Event reporting node 116 receives start report 326 and summary report 328 at high traffic levels from numerous content requesting nodes. Each report is logged as an event by process 402 using conventional database technology. Logged events are stored for a time in events data base 404. Synchronization of multiple parallel event reporting nodes may result in additional database transactions by event reporting node 116 as to records in events data base 404.

From time to time records from events data base 404 are provided to reconciling node 118. Process 406, using conventional data base technology, accomplishes the comparison of records having one or more respective field values that are identical. In one variation, the tracking field is used exclusively. Table 502 in FIG. 5 identifies results of reconciliation for several combinations of reports being reconciled. If for a given tracking field value (or at a given time, date, content requesting node, and content providing node), reports A 332, B 342, C 326, D 328, and possibly E 336 have been logged, then a group of messages accomplishing a normal request and payment for data transfer can be inferred to have been completed successfully. Allocation of earnings by process 408 follows the identification of such a reconciliation result.

If on the other hand, no report is received for reconciliation having the given common field values, then it can be suspected that software on one or more nodes of network 100 may have been manipulated, compromising network integrity. Due to the large number of content requesting nodes and the lack of physical controls that could protect software on such nodes from being manipulated, it is likely that at least some of the failures to receive all expected reports may be a consequence of content requesting node software manipulation. In cases 508 and 510, some or all requested data transfer might have been successful; however, allocation of earnings may not be justified when there remains a possibility that a user of the respective content requesting node may insist that the debit to his account be reversed.

Allocation of earnings by process 408 is consummated by generating, according to conventional banking messaging and data base technology, requests for funds transfer by process 410 in banking node 114.

As described in detail above, network 100 overcomes the problems of the prior art and provides a basis for accurate allocation of earnings to the owners of rights in digital works stored on systems of the present invention or transferred according to methods of the present invention. These and other benefits are provided with lesser system performance penalties than heretofore possible.

The present invention has been described in the preferred embodiments. Several variations and modification shave also been described and suggested. Other embodiments, variations, and modifications known to those skilled in the art may be implemented without departing from the scope and spirit of the invention as recited in the claims below.

What is claimed is:

1. A method for managing access to a digital work, the method for execution by a reconciling node, the method comprising:
   receiving at the reconciling node via a network a first report, the first report being provided in response to a transaction that provided the digital work from a content providing node to a content requesting node, the first report comprising a transaction identifier, the transaction conducted in response to a request originated by the content requesting node;
   receiving at the reconciling node via the network a second report that originated from a content managing node in response to supplying by the content managing node information to validate the request, the second report comprising a value and a payee identifier;
   comparing at the reconciling node the value and the transaction identifier; and
   transmitting from the reconciling node onto the network a message enabling a credit to an account corresponding to the payee identifier, transmitting being in response to comparing.

2. The method of claim 1 wherein the first report comprises indicia of a difference, the difference prepared in accordance with a start report originating from the content requesting node and a summary report originating from the content requesting node.

3. The method of claim 1 wherein receiving the first report comprises:
   receiving via the network a plurality of records; and
   determining the first report in accordance with a record of the plurality.

4. A memory device comprising indicia of the method of claim 1.

5. A method for managing access to a digital work, the method for execution by a reconciling node, the method comprising:
   receiving at the reconciling node via a network a plurality of first reports, each first report being provided in response to a respective transaction that provided the digital work from a content providing node to a content requesting node, each first report comprising a respective transaction identifier and a respective first tracking value, each transaction being conducted in response to a respective request originated by the content requesting node;
   receiving at the reconciling node via the network a plurality of second reports, each second report originating from a content managing node in response to supplying by the content managing node information to validate the respective request, each second report comprising a respective value, a respective payee identifier, and a respective second tracking value;
   identifying at the reconciling node a particular first report and a particular second report, wherein the particular reports have corresponding tracking values;
   comparing at the reconciling node the respective transaction identifier of the particular first report and the respective value of the particular second report; and
   transmitting at the reconciling node onto the network a message enabling payment in accordance with the comparison.

6. The method of claim 5 wherein each tracking value comprises an address of the content requesting node.

7. The method of claim 5 wherein the method further comprises:
   receiving via the network a plurality of third reports, each third report comprising indicia of a respective debit in accordance with a respective transaction; and
   detecting the occurrence of an invalid transaction wherein for the invalid transaction, at least one of the first report, the second report, and the third report are not timely received.

8. The method of claim 5 wherein the method further comprises:
   receiving via the network a plurality of third reports, each third report comprising indicia of a respective debit in accordance with a respective transaction; and
   detecting the occurrence of an invalid transaction wherein for the invalid transaction, at least one of the first report, the second report, and the third report are not originated in a predetermined sequence.

9. The method of claim 8 wherein:
   the plurality of third reports is provided by a plurality of event reporting nodes;
   each third report comprises indicia of time of day determined by a respective event reporting node; and
   the method further comprises transmitting a second message via the network from which each event reporting node can adjust its time of day for eliminating error in sequence detection.

10. A memory device comprising indicia of the method of claim 5.

11. A method for managing access to a digital work, the method for execution by a first computer system, the method comprising:
    receiving at the first computer system via a network a first report, the first report being provided in response to a transaction that transferred via the network the digital work from a second computer system to a third computer system, the first report comprising a transaction identifier, the transaction conducted in response to a request originated by the third computer system;
    receiving at the first computer system via the network a second report that originated from a fourth computer system in response to supplying by the fourth computer system information for validating the request, the second report comprising a value and a payee identifier;
    comparing at the first computer system the value and the transaction identifier; and
    transmitting from the first computer system onto the network a message enabling a credit to an account corresponding to the payee identifier, transmitting being in response to comparing.

12. A memory device comprising indicia of the method of claim 11.

13. The method of claim 11 wherein the first report comprises indicia of a difference, the difference prepared in accordance with a start report originating from the content requesting node and a summary report originating from the content requesting node.

14. The method of claim 11 wherein receiving the first report comprises:
    receiving via the network a plurality of records; and
    determining the first report in accordance with a record of the plurality.

15. A method for managing access to a digital work, the method for execution by a reconciling node, the method comprising:
- receiving at the reconciling node via a network a first report, the first report being provided in response to a transaction that provided the digital work from a content providing node to a content requesting node, the first report comprising a transaction identifier, the transaction conducted in response to a request originated by the content requesting node;
- receiving at the reconciling node via the network a second report that originated from a content managing node in response to supplying by the content managing node information to validate the request, the second report comprising a value and a payee identifier;
- comparing at the reconciling node the value and the transaction identifier; and
- transmitting from the reconciling node onto the network a message enabling a credit to an account corresponding to the payee identifier, wherein:
  - transmitting is in response to comparing;
  - the first report comprises indicia of a difference, the difference prepared in accordance with a start report originating from the content requesting node and a summary report originating from the content requesting node; and
  - receiving the first report comprises receiving via the network a plurality of records and determining the first report in accordance with a record of the plurality.

16. A method for managing access to a digital work, the method for execution by a reconciling node, the method comprising:
- receiving via a network a plurality of first reports, each first report being provided in response to a respective transaction that provided the digital work from a content providing node to a content requesting node, each first report comprising a respective transaction identifier and a respective first tracking value;
- receiving via the network a plurality of second reports, each second report originating from a content managing node, each second report comprising a respective value, a respective payee identifier, and a respective second tracking value;
- identifying a particular first report and a particular second report, wherein the particular reports have corresponding tracking values;
- comparing the respective transaction identifier of the particular first report and the respective value of the particular second report;
- transmitting onto the network a message enabling payment in accordance with the comparison;
- receiving via the network a plurality of third reports, each third report comprising indicia of a respective debit in accordance with a respective transaction; and
- detecting the occurrence of an invalid transaction wherein for the invalid transaction, at least one of the first report, the second report, and the third report are not timely received, wherein:
  - the plurality of third reports is provided by a plurality of event reporting nodes;
  - each third report comprises indicia of time of day determined by a respective event reporting node; and
  - the method further comprises transmitting a second message via the network from which each event reporting node can adjust its time of day for eliminating error in sequence detection.

17. A method for managing access to a digital work, the method for execution by a reconciling node, the method comprising:
- receiving via a network a plurality of first reports, each first report being provided in response to a respective transaction that provided the digital work from a content providing node to a content requesting node, each first report comprising a respective transaction identifier and a respective first tracking value;
- receiving via the network a plurality of second reports, each second report originating from a content managing node, each second report comprising a respective value, a respective payee identifier, and a respective second tracking value;
- identifying a particular first report and a particular second report, wherein the particular reports have corresponding tracking values;
- comparing the respective transaction identifier of the particular first report and the respective value of the particular second report;
- transmitting onto the network a message enabling payment in accordance with the comparison;
- receiving via the network a plurality of third reports, each third report comprising indicia of a respective debit in accordance with a respective transaction; and
- detecting the occurrence of an invalid transaction wherein for the invalid transaction, at least one of the first report, the second report, and the third report are not originated in a predetermined sequence, wherein:
  - the plurality of third reports is provided by a plurality of event reporting nodes;
  - each third report comprises indicia of time of day determined by a respective event reporting node; and
  - the method further comprises transmitting a second message via the network from which each event reporting node can adjust its time of day for eliminating error in sequence detection.

18. A reconciling node, for managing access to a digital work, the reconciling node comprising:
- means for receiving via a provided network a first report, the first report being provided in response to a transaction that provided the digital work from a content providing node to a content requesting node, the first report comprising a transaction identifier, the transaction conducted in response to a request originated by the content requesting node;
- means for receiving via the network a second report that originated from a content managing node in response to supplying by the content managing node information to validate the request, the second report comprising a value and a payee identifier;
- means for comparing the value and the transaction identifier; and
- means for transmitting from the reconciling node onto the network a message enabling a credit to an account corresponding to the payee identifier, transmitting being responsive to the means for comparing.

19. The reconciling node of claim 18 wherein the first report comprises indicia of a difference, the difference prepared in accordance with a start report originating from the content requesting node and a summary report originating from the content requesting node.

20. The reconciling node of claim 18 wherein receiving the first report comprises:
- receiving via the network a plurality of records; and
- determining the first report in accordance with a record of the plurality.

21. A reconciling node for managing access to a digital work, the reconciling node comprising:
  means for receiving via a provided network a plurality of first reports, each first report being provided in response to a respective transaction that provided the digital work from a content providing node to a content requesting node, each first report comprising a respective transaction identifier and a respective first tracking value, the transaction conducted in response to a request originated by the content requesting node;
  means for receiving via the network a plurality of second reports, each second report originating from a content managing node in response to supplying by the content managing node information to validate the request, each second report comprising a respective value, a respective payee identifier, and a respective second tracking value;
  means for identifying a particular first report and a particular second report, wherein the particular reports have corresponding tracking values;
  means for comparing the respective transaction identifier of the particular first report and the respective value of the particular second report; and
  means for transmitting onto the network a message enabling payment in accordance with the comparison.

22. The reconciling node of claim 21 wherein each tracking value comprises an address of the content requesting node.

23. The reconciling node of claim 21 further comprising:
  means for receiving via the network a plurality of third reports, each third report comprising indicia of a respective debit in accordance with a respective transaction; and
  means for detecting the occurrence of an invalid transaction wherein for the invalid transaction, at least one of the first report, the second report, and the third report are not timely received.

24. The reconciling node of claim 21 further comprising:
  means for receiving via the network a plurality of third reports, each third report comprising indicia of a respective debit in accordance with a respective transaction; and
  means for detecting the occurrence of an invalid transaction wherein for the invalid transaction, at least one of the first report, the second report, and the third report are not originated in a predetermined sequence.

25. The reconciling node of claim 24 wherein:
  the plurality of third reports is provided by a plurality of event reporting nodes;
  each third report comprises indicia of time of day determined by a respective event reporting node; and
  the reconciling node further comprises means for transmitting a second message via the network from which each event reporting node can adjust its time of day for eliminating error in sequence detection.

26. A reconciling node for managing access to a digital work, the reconciling node comprising:
  means for receiving at the first computer system via a network a first report, the first report being provided in response to a transaction that transferred via the network the digital work from a second computer system to a third computer system, the first report comprising a transaction identifier, the transaction conducted in response to a request originated by the third computer system;
  means for receiving at the first computer system via the network a second report that originated from a fourth computer system in response to supplying by the fourth computer system information to validate the request, the second report comprising a value and a payee identifier;
  means for comparing at the first computer system the value and the transaction identifier; and
  means for transmitting from the first computer system onto the network a message enabling a credit to an account corresponding to the payee identifier.

27. The reconciling node of claim 26 wherein the first report comprises indicia of a difference, the difference prepared in accordance with a start report originating from the content requesting node and a summary report originating from the content requesting node.

28. The reconciling node of claim 26 wherein the means for receiving the first report comprises:
  means for receiving via the network a plurality of records; and
  means for determining the first report in accordance with a record of the plurality.

29. A reconciling node for managing access to a digital work, the reconciling node comprising:
  means for receiving via a provided network a first report, the first report being provided in response to a transaction that provided the digital work from a content providing node to a content requesting node, the first report comprising a transaction identifier, the transaction conducted in response to a request originated by the content requesting node;
  means for receiving via the network a second report that originated from a content managing node in response to supplying by the content managing node information to validate the request, the second report comprising a value and a payee identifier;
  means for comparing the value and the transaction identifier; and
  means for transmitting from the reconciling node onto the network a message enabling a credit to an account corresponding to the payee identifier, wherein:
    (1) the first report comprises indicia of a difference, the difference prepared in accordance with a start report originating from the content requesting node and a summary report originating from the content requesting node; and
    (2) the means for receiving the first report comprises means for receiving via the network a plurality of records and determining the first report in accordance with a record of the plurality.

30. A reconciling node for managing access to a digital work, the reconciling node comprising:
  means for receiving via a provided network a plurality of first reports, each first report being provided in response to a respective transaction that provided the digital work from a content providing node to a content requesting node, each first report comprising a respective transaction identifier and a respective first tracking value;
  means for receiving via the network a plurality of second reports, each second report originating from a content managing node, each second report comprising a respective value, a respective payee identifier, and a respective second tracking value;
  means for identifying a particular first report and a particular second report, wherein the particular reports have corresponding tracking values;

means for comparing the respective transaction identifier of the particular first report and the respective value of the particular second report;

means for transmitting onto the network a message enabling payment in accordance with the comparison;

means for receiving via the network a plurality of third reports, each third report comprising indicia of a respective debit in accordance with a respective transaction; and means for detecting the occurrence of an invalid transaction wherein for the invalid transaction, at least one of the first report, the second report, and the third report are not timely received, wherein:

(1) the plurality of third reports is provided by a plurality of event reporting nodes;

(2) each third report comprises indicia of time of day determined by a respective event reporting node; and (3) the reconciling node further comprises means for transmitting a second message via the network from which each event reporting node can adjust its time of day for eliminating error in sequence detection.

31. A reconciling node for managing access to a digital work, the reconciling node comprising:

means for receiving via a provided network a plurality of first reports, each first report being provided in response to a respective transaction that provided the digital work from a content providing node to a content requesting node, each first report comprising a respective transaction identifier and a respective first tracking value;

means for receiving via the network a plurality of second reports, each second report originating from a content managing node, each second report comprising a respective value, a respective payee identifier, and a respective second tracking value;

means for identifying a particular first report and a particular second report, wherein the particular reports have corresponding tracking values;

means for comparing the respective transaction identifier of the particular first report and the respective value of the particular second report;

means for transmitting onto the network a message enabling payment in accordance with the comparison;

means for receiving via the network a plurality of third reports, each third report comprising indicia of a respective debit in accordance with a respective transaction; and means for detecting the occurrence of an invalid transaction wherein for the invalid transaction, at least one of the first report, the second report, and the third report are not originated in a predetermined sequence, wherein:

(1) the plurality of third reports is provided by a plurality of event reporting nodes;

(2) each third report comprises indicia of time of day determined by a respective event reporting node; and (3) the reconciling node further comprises means for transmitting a second message via the network from which each event reporting node can adjust its time of day for eliminating error in sequence detection.

* * * * *